US012737412B2

(12) United States Patent
Ware et al.

(10) Patent No.: US 12,737,412 B2
(45) **Date of Patent: *Sep. 15, 2026**

(54) COMPUTER-BASED SYSTEMS CONFIGURED FOR AUTOMATED IMAGE GENERATION AND METHODS OF USE THEREOF

(71) Applicant: Go Daddy Operating Company, LLC, Tempe, AZ (US)

(72) Inventors: Eugene Ware, Hawthorn East (AU); Robert de Lisle, Queensland (AU); Alice Miller, Victoria (AU); Jacob Wischnat, Tasmania (AU); Jeffrey Hudson, Victoria (AU); Andrew Harris, Victoria (AU); John Bralich, Miami, FL (US); Shaurya Shubham, Tempe, AZ (US)

(73) Assignee: Go Daddy Operating Company, LLC, Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/081,403

(22) Filed: Mar. 17, 2025

(65) Prior Publication Data

US 2026/0072978 A1 Mar. 12, 2026

Related U.S. Application Data

(63) Continuation of application No. 18/828,706, filed on Sep. 9, 2024, now Pat. No. 12,254,040.

(51) Int. Cl.
*G06F 16/535* (2019.01)
*G06F 16/51* (2019.01)
*G06F 16/538* (2019.01)

(52) U.S. Cl.
CPC ............ *G06F 16/535* (2019.01); *G06F 16/51* (2019.01); *G06F 16/538* (2019.01)

(58) Field of Classification Search
CPC ....... G06F 16/535; G06F 16/51; G06F 16/538
See application file for complete search history.

(56) References Cited

U.S. PATENT DOCUMENTS

| | | | | |
|---|---|---|---|---|
| 11,050,793 | B2 | 6/2021 | Jeyakumar et al. | |
| 2006/0221190 | A1* | 10/2006 | Limberis ............ | G06F 16/4393 348/207.1 |
| 2009/0320073 | A1* | 12/2009 | Reisman ............. | H04N 21/482 709/227 |
| 2010/0070448 | A1* | 3/2010 | Omoigui ............ | H10F 39/1825 706/55 |

(Continued)

*Primary Examiner* — Angelica Ruiz
(74) *Attorney, Agent, or Firm* — CHIP LAW GROUP

(57) ABSTRACT

In at least one embodiment, a method may include receiving at least one domain name and context information associated with an entity, generating at least one attribute from parsing the at least one domain name, generating an inferred profile based on the at least one attribute and the context information, generating, by utilizing a keyword machine learning model, a plurality of keywords based on the inferred profile, acquiring a first plurality of images from a data source based on the plurality of keywords, and automatically embedding at least one image from the first plurality of images in at least one website, wherein the at least one image is selected based on a predetermined criterion.

18 Claims, 8 Drawing Sheets

(56) References Cited

U.S. PATENT DOCUMENTS

2014/0129942 A1* 5/2014 Rathod ............ H04N 21/44226
715/720
2015/0135206 A1* 5/2015 Reisman ................ H04H 20/93
725/18
2018/0027006 A1* 1/2018 Zimmermann ..... H04L 63/0227
726/11
2018/0246983 A1 8/2018 Rathod
2019/0361877 A1 11/2019 Rogynskyy et al.
2024/0111498 A1* 4/2024 Vaughn ..................... G06F 8/30
2024/0353981 A1* 10/2024 Horton .................. H04L 67/306
2024/0427566 A1* 12/2024 Lin ........................... G06F 8/33

* cited by examiner

COMPUTER-BASED SYSTEMS CONFIGURED FOR AUTOMATED IMAGE GENERATION AND METHODS OF USE THEREOF

CROSS REFERENCE TO RELATED APPLICATION

This is a continuation of U.S. application Ser. No. 18/828,706, filed Sep. 9, 2024, entitled "COMPUTER-BASED SYSTEMS CONFIGURED FOR AUTOMATED IMAGE GENERATION AND METHODS OF USE THEREOF", now U.S. Pat. No. 12,254,040, the specifications and drawings of which are incorporated herein by reference.

FIELD OF TECHNOLOGY

The present disclosure generally relates to computer-based systems configured for automated image generation.

BACKGROUND OF TECHNOLOGY

Logos or other types of marks could be conventionally designed by human on paper or in computer. Typically, a designer may need to understand the business that underlines the logo, draw inspirations from past experience and/or avoid existing designs to come up with a unique new design. Typically, conventional logo design may require high skills and could be time consuming.

As such, it may be desirable to have a machine to automate the logo generation based on a few inputs.

SUMMARY OF DESCRIBED SUBJECT MATTER

In some aspects, at least some techniques described herein relate to an illustrative method, including: receiving, by at least one processor via an application programming interface (API) query engine, at least one domain name and context information associated with an entity; generating, by the at least one processor, at least one attribute from parsing the at least one domain name; generating, by the at least one processor utilizing a profile machine learning model, an inferred profile based on the at least one attribute and the context information; generating, by the at least one processor utilizing a keyword machine learning model, a plurality of keywords based on the inferred profile; acquiring, by the at least one processor via APIs, a first plurality of images from a first data source based on the plurality of keywords; indexing, by the at least one processor, the first plurality of images based on text and image embeddings thereof to generate a second plurality of images; filtering, by the at least one processor via a blacklist filter with a predetermined blacklist, the second plurality of images to produce a third plurality of images; ranking, by the at least one processor via a ranker, the third plurality of images based on respective relevancies to the at least one attribute and the context information; selecting, by the at least one processor, a predetermined number of images from the third plurality of images to form a fourth plurality of images, the predetermined number of images ranked higher than rest of the images in the third plurality of images; transmitting, by the at least one processor via APIs, the fourth plurality of images to a computing device associated with the entity; receiving, by the at least one processor via APIs, a selection identifying one of the fourth plurality of images; and automatically embedding, by the at least one processor, the identified one of the fourth plurality of images in at least one website.

In some aspects, at least some techniques described herein relate to a method, wherein the context information includes industries and features associated with the entity.

In some aspects, at least some techniques described herein relate to a method, wherein parsing the at least one domain name includes extracting at least one uniform resource locator (URL) that identifies the at least one domain name.

In some aspects, at least some techniques described herein relate to a method, further including providing the at least one URL to a large language model (LLM) for extracting at least one meaning from the at least one URL and including the at least one meaning in the at least one attribute.

In some aspects, at least some techniques described herein relate to a method, wherein the inferred profile includes at least an industry associated with the entity.

In some aspects, at least some techniques described herein relate to a method, wherein the industry is predicted by a domain-to-industry classification model when the context information does not contain industry information.

In some aspects, at least some techniques described herein relate to a method, further including storing the inferred profile and the plurality of keywords in a database shared by multiple applications.

In some aspects, at least some techniques described herein relate to a method, wherein the first data source is at least one first source remote repository.

In some aspects, at least some techniques described herein relate to a method, wherein the first data source is at least one second source repository when the at least one first source remote repository is not accessible.

In some aspects, at least some techniques described herein relate to a method, further including an embedding query generator to generate a plurality of features used to acquire the first plurality of images from the first data source.

In some aspects, at least some techniques described herein relate to a method, wherein the indexing includes encoding the first plurality of images into visual multi-modal feature vectors.

In some aspects, at least some techniques described herein relate to a method, wherein the indexing includes generating descriptive captions for each of the first plurality of images by an image caption model.

In some aspects, at least some techniques described herein relate to a method, wherein the descriptive captions are encoded into semantic text vector embeddings.

In some aspects, at least some techniques described herein relate to a method, wherein the indexing includes downloading metadata associated with each of the first plurality of images.

In some aspects, at least some techniques described herein relate to a method, wherein the metadata are encoded into semantic text vector embeddings.

In some aspects, at least some techniques described herein relate to a method, wherein the ranking includes penalizing a ranking of one of the third plurality of images based on a predetermined algorithm.

In some aspects, at least some techniques described herein relate to a method, wherein the ranking includes reordering rankings of the third plurality of images based on a predetermined diversification algorithm.

In some aspects, at least some techniques described herein relate to a method, wherein the fourth plurality of images are logo icons transferred from the third plurality of images.

In some aspects, at least some techniques described herein relate to a system, including: at least one processor; and at least one memory storing a plurality of computing instructions configured to instruct the at least one processor to: receive, via an application programming interface (API) query engine, at least one domain name and context information associated with an entity; generate at least one attribute from parsing the at least one domain name; generate, utilizing a profile machine learning model, an inferred profile based on the at least one attribute and the context information; generate, utilizing a keyword machine learning model, a plurality of keywords based on the inferred profile; acquire, via APIs, a first plurality of images from a first data source based on the plurality of keywords; index the first plurality of images based on text and image embeddings thereof to generate a second plurality of images; filter, via a blacklist filter with a predetermined blacklist, the second plurality of images to produce a third plurality of images; rank, via a ranker, the third plurality of images based on respective relevancies to the at least one attribute and the context information; select a predetermined number of images from the third plurality of images to form a fourth plurality of images, the predetermined number of images ranked higher than rest of the images in the third plurality of images; transmit, via APIs, the fourth plurality of images to a computing device associated with the entity; receive, via APIs, a selection identifying one of the fourth plurality of images; and automatically embed the identified one of the fourth plurality of images in at least one website.

In some aspects, at least some techniques described herein relate to a system, wherein the computing instructions are further configured to instruct the at least one processor to: extract at least one uniform resource locator (URL) that identifies the at least one domain name; provide the at least one URL to a large language model (LLM) for extracting at least one meaning from the at least one URL; and include the at least one meaning in the at least one attribute.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

In data science, data is structured and relational, usually presented as a set of tables with relational links. The data captures some aspect of human interactions with a complex system. The data science attempts to predict some aspect of human behavior, decisions, or activities (e.g., to predict whether a customer can buy again after a sale).

Given a prediction problem, a data scientist must first form variables, otherwise known as features. The data scientist may start by using some static fields (e.g., gender, age, etc.) from the tables as existing features, then synthesize new features (e.g., "percentile of a certain feature") from the existing features.

In at least some embodiments, the present disclosure is directed to automated logo and/or image creation from domain names and related business context. The automatically created logos and/or images can be automatically embedded in a website thus automate the website creation process.

Figure 1:
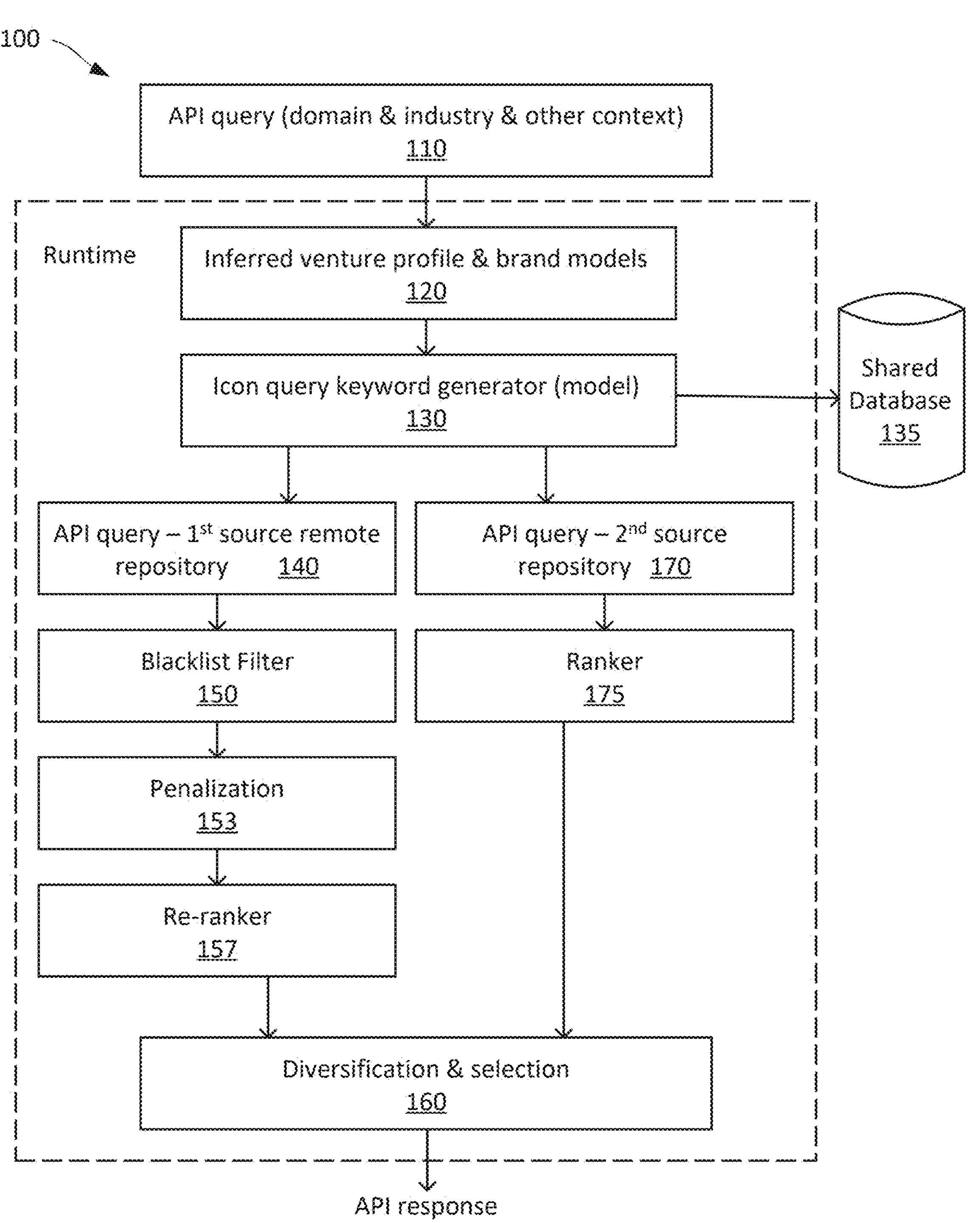
FIG. 1 is a flowchart illustrating an automated logo creation process in accordance with one or more embodiments of the present disclosure.

FIG. 1 is a flowchart illustrating an automated logo creation process 100 in accordance with one or more embodiments of the present disclosure. The process 100 includes exemplary blocks 110-175 as described herein below.

Block 110 may exemplarily perform an application programming interface (API) query of domain name and context information of a domain registrant. The context information may include industries and features of the registrant's business.

For example, an input to the API query may exemplarily include:

(i) Domain name: e.g., Janes-pizza.com.

(ii) Venture ID: A unique identifier of an enterprise (business/organization/entity) that wants to utilize the domain name.

The context information (if present, the context information can be used as a "hint" to help the logo generation process. If not present, context information can be predicted) may exemplarily include:

(i) Business Name—e.g., Jane's Pizza Pies;

(ii) Business Description—e.g., "A cozy pizza restaurant offering a variety of delicious pizzas and Italian dishes in a welcoming atmosphere.";

(iii) Business Industry Vertical (the enterprise's industry vertical. An "industry vertical" refers to a group of companies that focus on a shared niche or specialized market, spanning multiple industries. It's more specific than the broad categories of industries and includes sectors like 3D printing, eSports, fintech, and more. These verticals are also known as vertical markets and they cater to a specialized customer audience with particular needs);

(iv) Business Personality-one to three descriptors of the personality of the venture, e.g., classic, innovative, youthful, traditional, down-to-earth, fun, luxurious, eclectic, adventurous, Zen, minimal, rebellious, athletic, romantic, reliable, formal, nostalgic, earthy, friendly, daring;

(v) Business Tagline—e.g., "Serving Joyful Pizza Moments".

In block 110, once a new domain name is registered, the automated logo creation process 100 calls a logo generation representational state transfer (REST) API endpoint, which kicks off the entire logo generation including an inferred venture/brand creation process. In general, a REST API endpoint refers to a specific uniform resource locator (URL) that serves as the point of contact between an API client and an API server. It may be where API clients send requests to access the API's functionality and data. Each endpoint corresponds to a resource or a set of operations that can be performed on the API, such as retrieving, creating, updating, or deleting data.

In at least some aspects of at least one or more embodiments, block 120 may exemplarily perform an industry classification model prediction to create inferred venture business profile and/or inferred venture brand based on the domain name and/or the context information for a predicted industry.

In some embodiments, block 120 may involve parsing the domain name and extract a meaning therefrom. The parsing includes extracting the part of a URL that identifies the domain, and removing meaningless characters, such as numerical characters, from the URL. The parse resulted word may be provided to a large language model (LLM) for extracting the meaning.

In block 120, the automated logo creation process 100 may employ a LLM and an industry classification model to predict an "inferred venture business profile" and an "inferred venture brand" based on the domain name and the context information.

In at least some aspects of at least one or more embodiments, if the industry is not provided, then an specifically trained domain-to-industry classification model may be executed which may predict one of, for example, a X number (e.g., 1000; 5,000; 10,000; 1,000-1,000,000; etc.) of industries based on the domain name, wherein at least one model corresponds to at least one vertical. A top prediction may be used. If the industry has been provided (e.g., passed through by the customer through the user interface), then the provided industry may be used instead.

In at least some aspects of at least one or more embodiments, if the industry is not provided, then a specifically trained domain-to-industry classification model may be executed to predict one of at least 100 industries based on the domain name.

In at least some aspects of at least one or more embodiments, if the industry is not provided, then an enterprise trained domain to industry classification model may be called upon to predict one of 10 to 10,000 industries based on the domain name.

In at least some aspects of at least one or more embodiments, if the industry is not provided, then an enterprise trained domain to industry classification model may be called upon to predict 10 to 100,000 industries based on the domain name.

In at least some aspects of at least one or more embodiments, the list of attributes, such as business name and description, from block 120, along with the predicted vertical industry may be then used as input into an exemplary Large Language Model (LLM) prompt. For example, an exemplary LLM may predict (only items that have not been provided may be generated):

Business Name—e.g., Jane's Pizza Pies.

Business Description—e.g., "A cozy pizza restaurant offering a variety of delicious pizzas and Italian dishes in a welcoming atmosphere."

Business Personality—one to three descriptors of the personality of the venture: e.g., classic, innovative, youthful, traditional, down-to-earth, fun, luxurious, eclectic, adventurous, Zen, minimal, rebellious, athletic, romantic, reliable, formal, nostalgic, earthy, friendly, daring.

Business Tagline—e.g., "Serving Joyful Pizza Moments".

Domain content and its relevancy.

Website Predictions—purpose and structure of the website.

Brand Information (a set of brand related information is also predicted, which may be used for logo generation, as well as can be used by downstream consumers for auto-creation-such as a building websites and social media posts): design style and search keywords, etc.

In at least some aspects of at least one or more embodiments, block 130 represents an exemplary icon keyword query generator which exemplarily employs machine learning models to generate keywords. In block 130, up to, for instance, 10 different logo icon search keywords may be predicted, which can be used to search a first source remote icon repository, to locate a list of possible icons that may be relevant as a hero icon for a logo. This is known in the industry as "query expansion". E.g.: pizza, restaurant, chef, Italian, dough, slice, mixologist, grill, chef, cook. This may be done as part of the original large language model call listed above in block 120.

In at least some aspects of at least one or more embodiments, block 135 represents an exemplary product graph repository. In block 135, all the predictions as detailed in blocks 120 and 130 may be stored in a shared database 135. These predictions include information about the final generated logo images that can be consumed.

In at least some aspects of at least one or more embodiments, block 140 represents exemplary API query to a first source remote icon repository. The logo icon search keywords generated in block 130 may then be used to query a first source remote icon repository. For each keyword a list of icons (first plurality of images) may be retrieved. This retrieved data includes URLs of the icons, lists of tags for the icons, and descriptions of the icons. This retrieved data may be exemplarily indexed in a process shown in FIG. 3 to form a second plurality of images.

In at least some aspects of at least one or more embodiments, block 150 represents an exemplary blacklist filtering step. To remove icons that may contains sensitive content (e.g., Mature age content), the tags of each retrieved icon image retrieved in block 140 may be compared with a blacklist of sensitive search terms. Any icon that matches the blacklist may be removed from consideration as a candidate for the logo generation. The remaining icons form a third plurality of images.

In at least some aspects of at least one or more embodiments, block 153 and block 157 exemplarily represent a penalization and re-ranker step, respectively. The term, "re-ranker", described herein generally refers to a "learning-to-rank approach". A re-ranker component sifts through the response provided to a retriever and ranks them based on their relevance. The re-ranker may be needed because a first-stage retriever may be flawed. It may rank some irrelevant documents high, while some relevant documents may get lower scores. Re-ranker refines these results and brings up the most relevant answers.

To remove icons from the candidate list that may rank well for the search keywords, but not be as highly relevant for the venture, one may apply a penalty algorithm. For example, a business may have the icon keywords "pizza slice", "pizza toppings" and "cheese". The keyword "cheese" may be returning images of mice with cheese as an example, so this would be less relevant that icons with pizza slices. To penalize these icons which have mice in them (which would be present in the tags for that image), one may use the following process.

Generating a semantic text search query based on the information process 100 has learned of the venture using a string template pertaining to the business.

For each candidate icon, process 100 generates a semantic text search query, using an icon related template.

Process 100 then encodes both the venture query strings, and the candidate icon template strings into a semantic vector using a text similarity encoding model. As a result, process 100 has a venture query vector, and a set of vectors for each icon.

In at least some aspects of at least one or more embodiments, process 100 compares the similarity of the query and the values to penalize icons with keywords that differ from the query in order to surface the most relevant icons.

In some embodiments, process 100 sorts the icons by the penalized similarity scores, and ends up with a list of icons that may be more relevant to the venture.

In the above example, icons which have the tag "mouse", or "mice" would be penalized and end up ranking towards the end of the list of candidate icons. In at least some aspects of at least one or more embodiments, the process 100 may choose to remove low ranking icons from consideration.

In some implementations, however, block 153, i.e., the penalty factor, may be optional and can be omitted.

In at least some aspects of at least one or more embodiments, block 160 represents an exemplary diversification and selection step. To provide a diverse set of relevant ideas for consideration for a logo icon, process 100 performs a diversification operation. In the above pizza example, this prevents the top 12 icons from all being the same idea (e.g., icons of a pizza slice). To do this, a diversification algorithm (e.g., topic modelling algorithm, collaborative filtering, ensemble modeling algorithm, topic modeling algorithm, diversified search algorithm, may be used across the set of icon sentence vectors (as calculated in blocks 153 and 157, which can reorder the set of relevant icons, while introducing diversity. The result may be that a diverse set of results including pizza slices, pizza toppings, pizza delivery vehicles, etc., can appear in the top results. After the diversification, a predetermined number of logo icons with the highest ranking may be selected as candidate logo icons (fourth plurality of images) to be outputted through an API response. The predetermined number may be set by a user or dynamically determined by process 100 based on the ranking of the candidates. For example, if top 5 logo icons may be ranked significantly higher than the rest of the retrieved logo icons, the predetermined number may be set at 5.

In some implementations, the diversification of block 160 may be optional and can be omitted.

In at least some aspects of at least one or more embodiments, block 170 represents exemplary API query to a second source image repository. As API calls to a first source remote icon repository (block 140) may fail, the API query to a private image repository can provide a fallback to ensure that a logo/brand/inferred venture profile can be produced under these failure scenarios.

In the case of the first source remote icon repository experiencing failure, a set of pre-defined generic slogans, generic business descriptions, and generic logo icon shape keywords, and photo search keywords, are referenced. The top 10 most popular combination of business personality attributes may be referenced. In a manner similar to the ranking process described in blocks 153 and 157, process 100 uses a query phrase composed out of salient attributes of the venture and domain. Process 100 then compare the query phrase to each of the generic slogans, descriptions, etc., to sort and rand them and find a combination that may be most suitable under the pre-defined conditions.

In the event of a failure with the API calls to the first source remote icon repository, process 100 resorts to an internally maintained database of icon graphics, i.e., second source repository, in block 170, curated for each vertical in the internally maintained database. Process 100 fetches the icon graphics that align with the given or inferred industry vertical category, considering them as potential candidates for logo icons.

A query search phrase may be formulated based on a plurality of salient features about the venture. This phrase may then be employed to sort and rank the logo icons fetched from the internally maintained database in block 175.

Given that process 100 has access to the image files for each internally maintained logo icon, process 100 utilizes a multi-modal image encoder model to generate vector representations of the second source repository icon images. Subsequently, a multi-modal text encoder may be used to encode the query search phrase.

Process 100 then calculates a similarity metric score between the business query search phrase and each second source repository icon image. This allows process 100 to rank the images from highest to lowest similarity. The top 12 icons may then be selected to serve as logo icon images, replacing the at least one first source remote repository icon images in block 160.

Once a diverse set of, for instance, the top 12 relevant icon images are obtained at block 160, process 100 may then be ready to render 12 logos by combining the icons with brand information, typography and/or colors derived from the AI models/algorithms.

Figure 2:
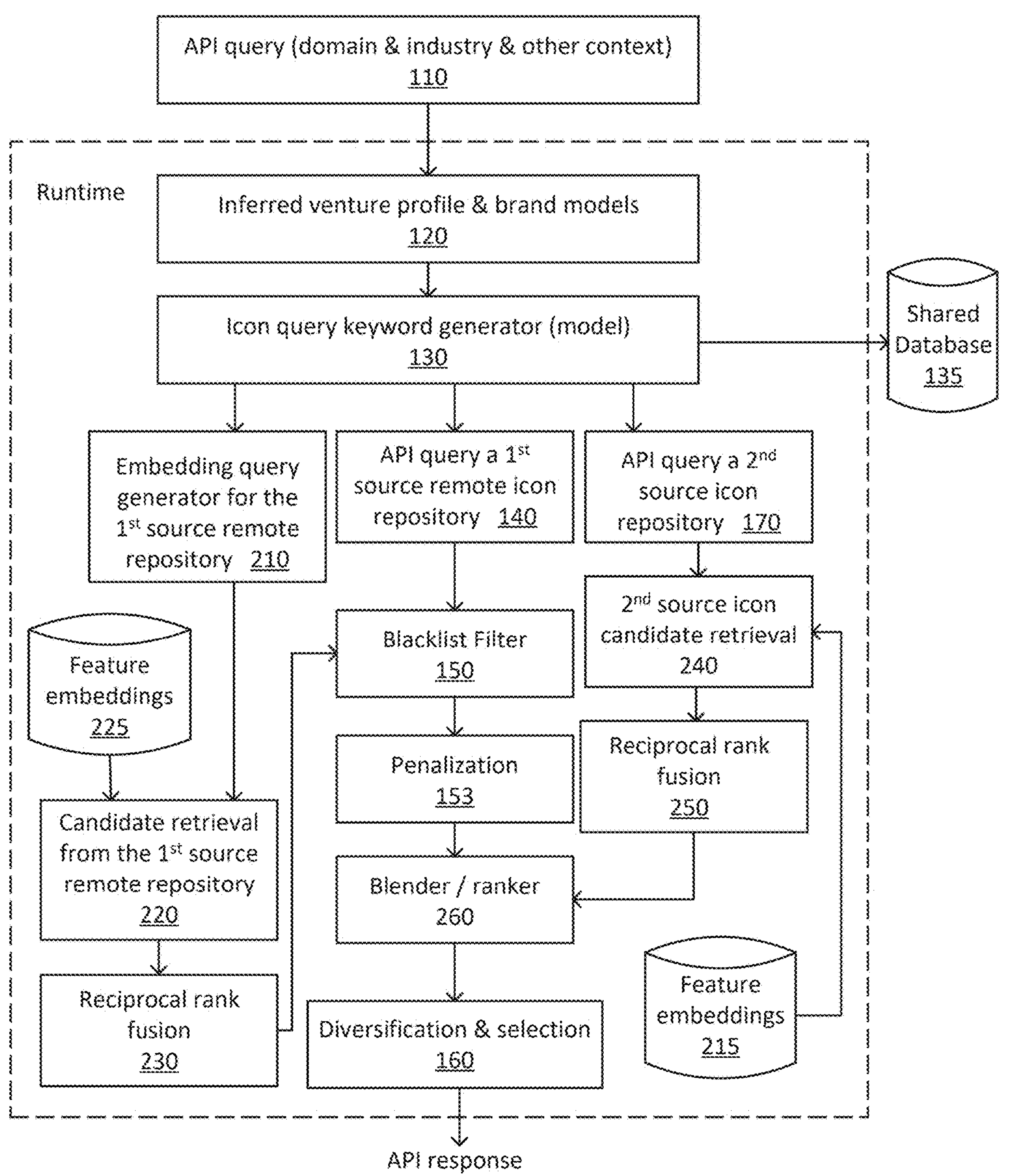
FIG. 2 is a flowchart illustrating another exemplary automated logo creation process in accordance with one or more embodiments of the present disclosure.

FIG. 2 is a flowchart illustrating another exemplary automated logo creation process 200 in accordance with one or more embodiments of the present disclosure. Process 200 may include exemplary steps represented by blocks 210-250 in addition to blocks 110-175 of process 100 shown in FIG. 1. Blocks 210-250 are described herein below.

In at least some aspects of at least one or more embodiments, block 210 may represent an exemplary embedding query generator for the at least one first source remote repository. In some embodiments, the embedding query generator may be a tool or function that may be programmed, without limitation, to generate one or more embeddings for queries. In some embodiments, embeddings may be in a form of numerical representations of concepts converted to number sequences to express relationships.

In addition to relying on the at least one first source remote repository's API for searching for logo icons, a computer-based system configured in accordance with process 200 may use a series of different features inferred about the venture on a precomputed vector embedding indexing to retrieve likely icon candidates.

In at least some aspects of at least one or more embodiments, block 220 represents an exemplary process of candidate retrieval from the at least one first source remote repository. The query feature vectors generated in block 210 may be used to retrieve logo icon candidates based on a similarity distance metric, from a vector database.

The vectors generated in block 210 may include at least one of:

- Venture Description for visual retrieval—this vector may be compared to the image encodings that have been pre-generated for all, e.g., icon images from at least one first source remote repository, and used to retrieve the top candidates based on visual similarity to the query phrase;
- Venture Description for icon caption retrieval—this vector may be compared to the text similarity encodings that have been pre-generated from synthetic image captions that describe each icon. E.g., an image of a pizza slice might have an image caption "a slice of pizza in an open pizza box" (the Venture Description may be used to retrieve the top candidates based on semantic similarity to the query phrase);
- Venture Icon Search Keywords for Icon keyword retrieval—this vector may be compared to Sentence Transformer Text Encodings that have been pre-generated from the concatenation of keyword tags associated with each icon. E.g., for an image of pizza slice, the tags might be "pizza slice", "slice of pizza", "pizza", "pizza box" (the query icon search keyword phrase may be used to retrieve the top candidates based on similarity to the keyword tags for each Icon); or
- any combination thereof.

In at least some aspects of at least one or more embodiments, block 230 represents a rank fusion which is a method to combine the result of multiple search queries (e.g., the 3 different sets of icon ranking candidates in block 220. In another example, 5 different sets of icon ranking candidates may be retrieved in block 220. In yet another example, 8 different sets of icon ranking candidates may be retrieved in block 220), into a single ranked list, based on a reciprocal ranking score. In some embodiments, the exemplary computer-based system may be configured such that items that rank high in multiple candidate rankings may be boosted to the top of the list, while still allowing items that only show in the top results to have a ranking score. In some embodiments, the exemplary computer-based system may be configured to self-learn during process 200 so that when a particular item being returned from a ranking feature at a more frequent rate than another item, the more confident (e.g., level of confidence) the exemplary computer-based system may be in its ranking (e.g., raising the level of confidence from 80% to 90%, etc.). In exemplary case, if the exemplary computer-based system programmed in accordance with process 200 sees a particular slice of pizza icon appear in the top 200 results based on its visual features, caption description and keywords (i.e., it appears in all 3 lists), then the particular slice of pizza icon can likely be ranked near the top of the final fused list of icon candidates, and certainly ahead of an icon which might only appear in one of the ranked lists that might not be as relevant.

In at least some aspects of at least one or more embodiments, block 240 represents exemplary a second source icon repository candidate retrieval. Just as the embedding retrieval and ranking pipeline may be applied to the first source remote repository icons in blocks 210, 220 and 230, process 200 executes a similar procedure, but process 200 may be tailored to the second source repository icons. In this case, the second source repository icon feature embeddings in block 215 may be stored in their own vector database index as vector database. Process 200 uses a similar set of ranking features as described for the at least one first source remote repository (such as Image Features for Icons, text encoding features of the captions describing each icon, and a text encoding of the keywords and categories associated with each second source repository icon. Process 200 fetches a set of candidates for each feature, and then use rank fusion in block 250 to combine the icons into a single ranked list of second source repository logo icon candidates. In some embodiments, the rank fusion in block 250 performs the same operation as block 230 as described above.

In at least some aspects of at least one or more embodiments, block 260 represents exemplary blender/re-ranker/LLM/VLM similar to block 157 shown in FIG. 1. At this point, process 200 has obtained ranking candidates for the first source remote repository images returned by the first source remote repository API (block 140). The first source remote repository icons using feature embeddings of block 225 use reciprocal rank fusion at block 230. The second source repository icons using feature embeddings 215 use rank fusion at block 250. At block 260, process 200 combines these icons from different sources into a single ranked list of the most relevant logo icons. Process 200 may use a combination of techniques to rank these lists:

- Apply the same rank fusion scoring method on multiple features, but across the candidate lists to combine into a single list.
- Use re-ranking model to more accurately rank icons based on the visual and textual features in the metadata of each icon.
- Use a large language model to select the most relevant icon based on the features of the metadata of each icon. Process 200 may restrict the number of candidate icons that may be passed into the LLM prompt to optimize for query speed, utilizing, for example, without limitation, building retrieval augmented generation (RAG) systems.
- Use a large visual language model (VLM) to select the most relevant icon based on passing the top, for instance, 10-20 images to the model and asking it to pick the top 12 and return the order. This leverages the improved world model and visual reasoning capability of the VLM to get an improved ranked list of icons, at the trade-off of an additional API call and related expense. Once again, doing this only for a limited subset of these candidates can speed up inference speed, and may be common with RAG systems.

By running a large number of venture information through this process, and keeping track of which icons get selected and ranked by the LLM/VLM above, process 200 can also use this information as training data to fine-tune the second source repository's re-ranking model on top of the embedded vector features, that may be able to perform this re-ranking task at high quality and much lower latency.

Figure 3:
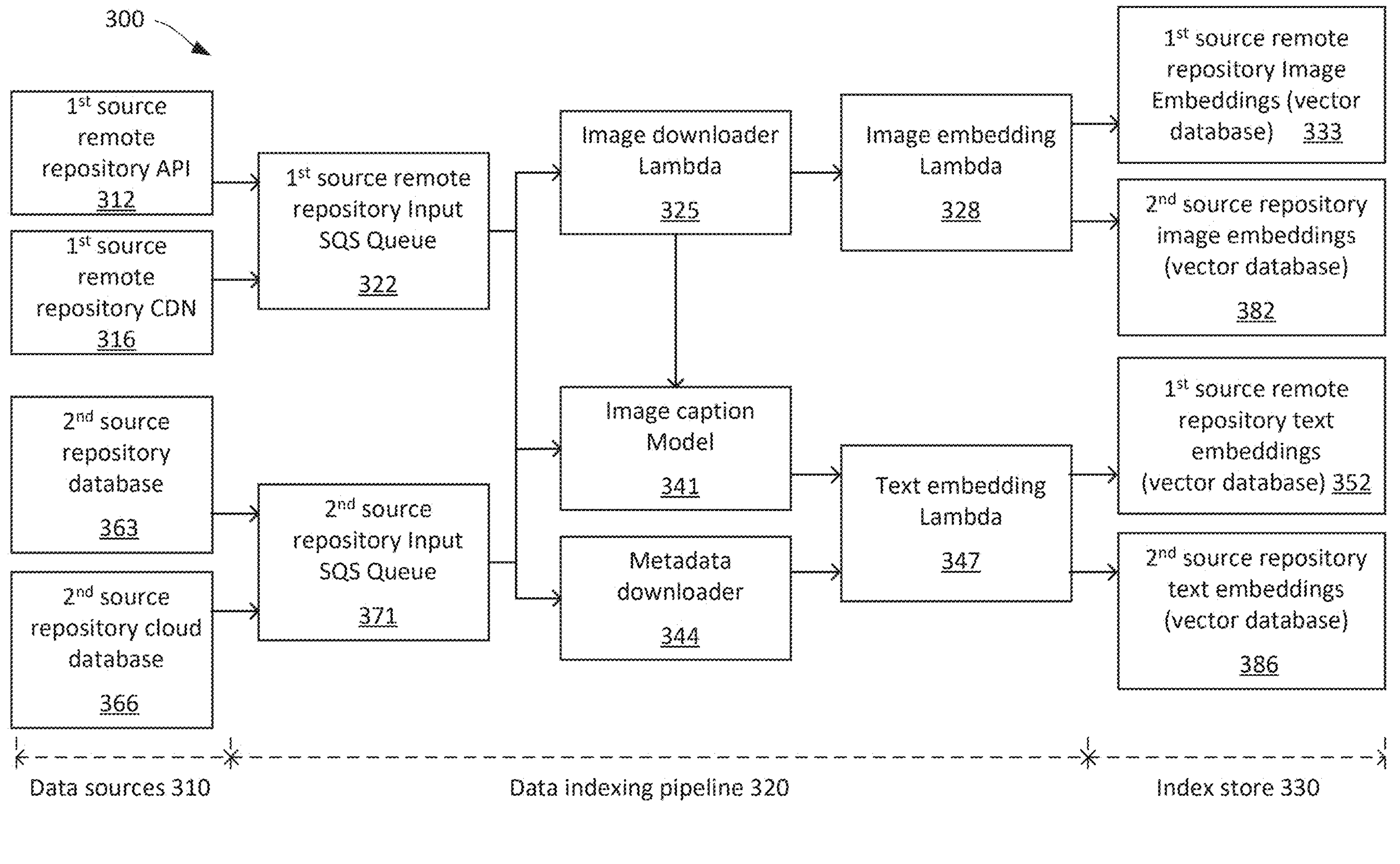
FIG. 3 is a flowchart illustrating an image data processing and indexing pipeline in accordance with one or more embodiments of the present disclosure.

FIG. 3 is a flowchart illustrating an image data processing and indexing pipeline 300 in accordance with one or more embodiments of the present disclosure. In some embodiments, image data processing and indexing pipeline 300 may be a part of the API query of first source remote icon repository of block 140 and the API query of second source icon repository of block 170 shown in both FIGS. 1 and 2. Indexing pipeline 300 receives images (second plurality of images) retrieved from either the at least one first source remote repository or the at least one second source repository and generates indexed images (third plurality of images). A core of the data processing and indexing pipeline 300 can be divided into three parts: data sources 310, data indexing pipeline 320 and index store 330.

In some embodiments, primary sources of data for icon images from the first source remote icon repository may come via it's REST API in block 312 for icon metadata, and the first source remote icon repository's content delivery network (CDN) for the physical image files in block 316. As an example, the first source remote icon repository may provide access to a vast database of vector icons.

Identifiers of each first source remote repository icon image may be added to an input queue in block 322 where the icon image awaits processing.

Once in the queue, a first source remote repository image identifier can be queued for downloading the physical image file in block 325. It can also be queued to download additional metadata in block 344 for the via the first source remote icon repository's API.

The downloaded first source remote icon repository images may then be encoded into visual multi-modal feature vectors ("embeddings") using a multi-modal image encoder in block 328. This may exemplarily be an image embedding model. The feature vectors (image embeddings) may then be stored in at least one first source remote repository which may be a vector database in block 333 so that the image embeddings can be queried efficiently during logo search generation.

In some embodiments, the image files may also be passed to an image caption model to generate descriptive captions for each icon in block 341.

In addition, relevant text fields from the first source remote icon repository metadata downloaded in block 344 (tags and description) may be encoded into semantic text vector embeddings in block 347. The vectorized embedding features (text embeddings) may be then saved into at least one first source remote repository which may be a vector database in block 352.

As shown in FIG. 3, the second source icon repository indexing pipeline has a similar flow as the at least one first source remote repository indexing pipeline. A main difference may be that the source of the metadata may not be the first source remote icon repository API, but the second source icon repository database in block 363. As an example, the at least one second source repository database may be an object store, and the source of the physical image files may be at least one second source icon repository cloud database in block 366.

As shown in FIG. 3, metadata for the second source repository icons may be similar to that of the first source remote repository icons, where the data indexing pipeline 320 may use a plurality of salient features of the icons.

As the images may already be present in an the object store in block 366, there may be no need to download the images.

The images may be visually in block 328 and stored as visual ranking features (image embeddings) in at least one second source repository which may be a vector database in block 382.

The images may be passed into a caption model in the same manner as the first source remote repository icons using an image caption model in block 341.

In some embodiments, the captions obtained from block 341 may then be also encoded as Text Vector Embedding (9) before being stored as textual vector embedding features in at least one second source repository which may be a vector database in block 386.

Figure 4A:
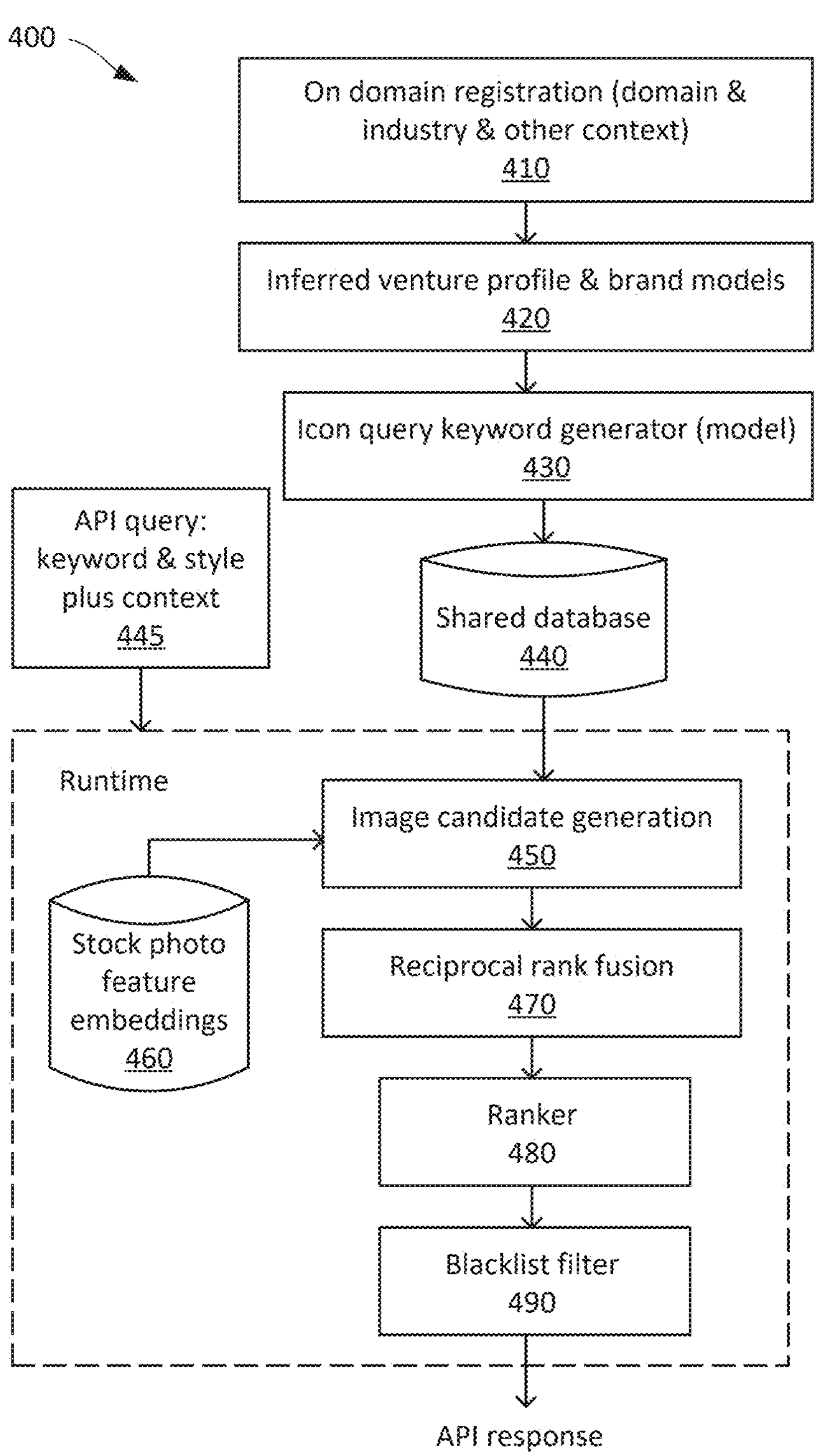
FIGS. 4A and 4B are flowcharts illustrating stock image generating processes for automated website creation in accordance with one or more embodiments of the present disclosure.
Figure 4B:
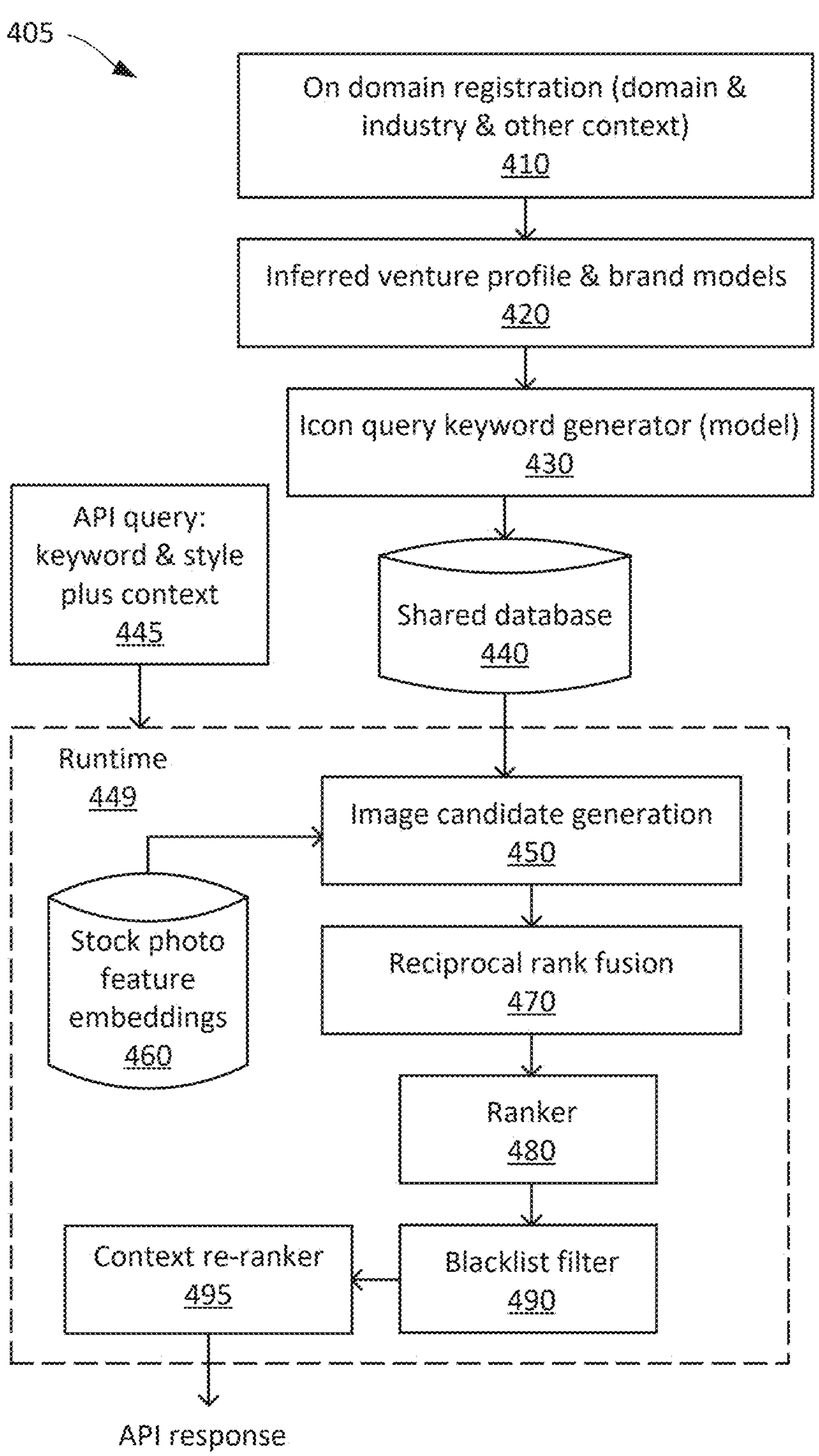

FIGS. 4A and 4B are flowcharts illustrating stock image generating processes 400 and 405 for automated website creation in accordance with one or more embodiments of the present disclosure. The generated stock images can be used for website background and/or header images. Process 400 as shown in FIG. 4A includes blocks 410-490. Process 405 as shown in FIG. 4B includes blocks 410-490 of process 400 and an additional block 495. Embodiments of processes 400 and 405 are described herein below.

In block 410, a new domain may exemplarily be registered. In executing block 410, process 400 or process 405 exemplarily calls a logo generation API, which kicks off the entire logo generation (and inferred venture/brand creation process). In some embodiments, the input to this API call may be a plurality of features relevant to the venture, including the domain name.

In block 420, an LLM, in conjunction with an industry classification model, predicts the "inferred venture business profile" and the "inferred venture brand". These predictions may be based on the domain name and a projected industry.

If the industry is not provided, then a specifically trained domain to industry classification model may be executed which may be configured to predict one of X number (e.g., 1,000; 1,500; 2,000, etc) of industries based on the domain name. A top prediction may be used. If the industry has been provided (e.g., passed through by the customer through the user interface), then the provided industry can be used instead.

A list of attributes from block 410, along with the predicted vertical industry may be then used as input into a large language model prompt. The large language model may predict domain content and its relevancy, and provide website predictions including purpose and structure of the website. In at least some aspects of at least one or more embodiments, block 430 refers to stock photo keyword query generator-up to, for example, 3 different stock photo search keywords may be predicted, which can be used to search a stock photo vector search, to locate a list of possible stock photos that may be relevant as the images for a venture to build a website. The stock photo keyword query generator may exemplarily employ machine learning models to generate the keywords. Use cases include picking a background image for a website, or other stock images used to populate a website.

In at least some aspects of at least one or more embodiments, block 430 is also known in the industry as "query expansion". E.g.: pizzeria, pizza, Italian cuisine, delicious, cheese, tomato. The query expansion may be done as part of the original large language model call listed above in block 420.

In block 440 which is identified as a shared database, all the predictions as detailed in block 420 and block 430 may be stored in the shared database. This enables these predictions to be used and shared by multiple products and teams for auto-creation purposes such as the automatic creation of websites, social media posts, email marketing templates, etc.

According to embodiments of the present disclosure, the core image search retrieval and ranking runtime system is shown in blocks 450-490 of FIG. 4A and in blocks 450-495 of FIG. 4B. In some embodiments, the core image search query may be of the form of a REST API Query which includes a keyword phrase (e.g., "pizza"), features relevant for describing the visual design style and additional ranking context including features relevant to the venture.

In at least some aspects of at least one or more embodiments, block 450 refers to image candidate generation—In order to retrieve a highly relevant list of stock photo images, process 400 or 405 processes the API query parameters, and generates a number of different search query embedding vectors:

- Process 400 or 405 takes the search keyword phrase, and use a text similarity encoder model to convert the search keyword into a vector.
  - i. This semantic text vector may be used to retrieve the top images against the following precomputed stock photo textual feature embeddings stored in a vector database in block 460.
  - ii. The features used for retrieval (encoded into text vector embeddings) include the following—the most relevant photo images may be retrieved based on features and feature vectors extracted from the photos visual content and metadata.
- Process 400 or 405 also takes the search keyword phrase and uses a multi-modal text encoder model to convert the search phrase into a vector embedding that can be used to search the visual representations of the stock photograph images. The visual Image Vector Embeddings were indexed and stored in the vector database in block 460 as part of the indexing process. Again, process 400 or 405 queries and retrieves the top photos based on these features.

In at least some aspects of at least one or more embodiments, block 470 refers to a rank fusion which pertains to combining the result of multiple search queries (e.g., the 4 different sets of icon ranking candidates described in block 460), into a single ranked list, based on a ranking score. The different lists can also be combined in different weights to balance the contribution of each feature to the ranking order.

In block 480, once the ranked and fused list of photo candidates is received from block 470, process 400 or 405 may then boost and rank the results based on other query parameters, such as the visual aesthetic design style, which can boost any images that may be of the requested aesthetic up the list of ranked photos. This may be done for other features such as color, photo purpose (e.g., Background image, header image, etc.). In some embodiments, to maintain photo relevance as the primary ranking metric, process 400 or 405 may impose a minimum relevancy for any boosted photo.

In block 490, with the ranked list of photos, process 400 or 405 then removes any photos that may be present in a list of black-listed images, or that may be unsuitable for a particular market or geography.

In block 495 of FIG. 4B, additional ranking context may be provided composed of salient features relevant to the venture. This can be used to further re-rank the results to maximize relevance. This can be done with:

- A re-ranking model or a similar model that has been fine-tuned on ranking data.
- A text-only large language model, which may be prompted to re-rank the list of candidate images based on relevance to the ranking context. This can be done by passing the list of descriptive image captions and features to the model, which the model can then reason over.
- A visual-language model-which can usual visual reasoning to evaluate the ranking order at run-time based on examining the visual content of the images.

Referring again to both FIGS. 4A and 4B, the final ranked list may then be returned as an API response. This list of images can then be used to automatically populate a website for automated website generation, or a social media post, or simply as the most relevant photo images through a keyword search for end customers to select stock photo images.

Figure 5A:
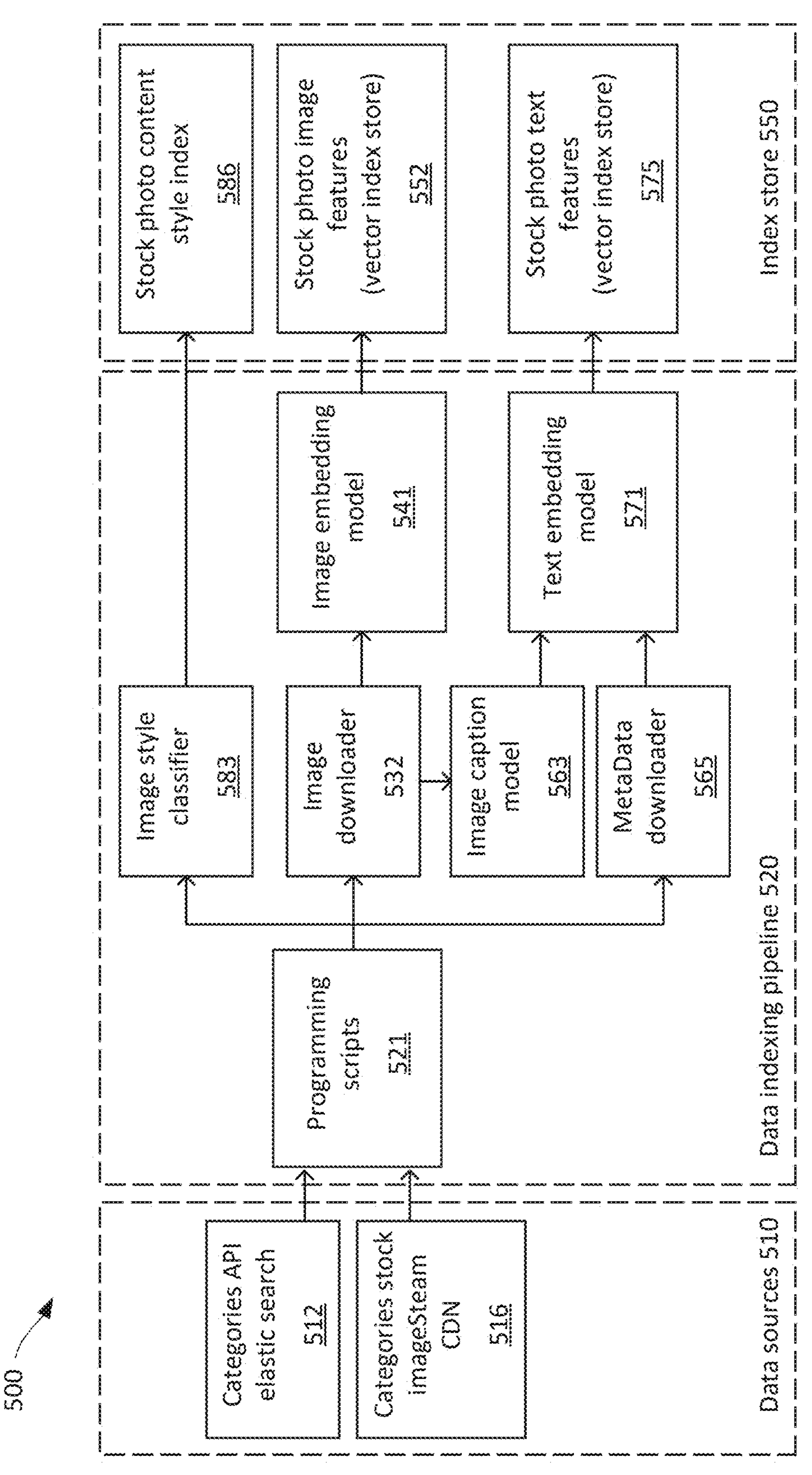
FIGS. 5A and 5B are flowcharts illustrating exemplary stock photo indexing flows in accordance with one or more embodiments of the present disclosure.
Figure 5B:
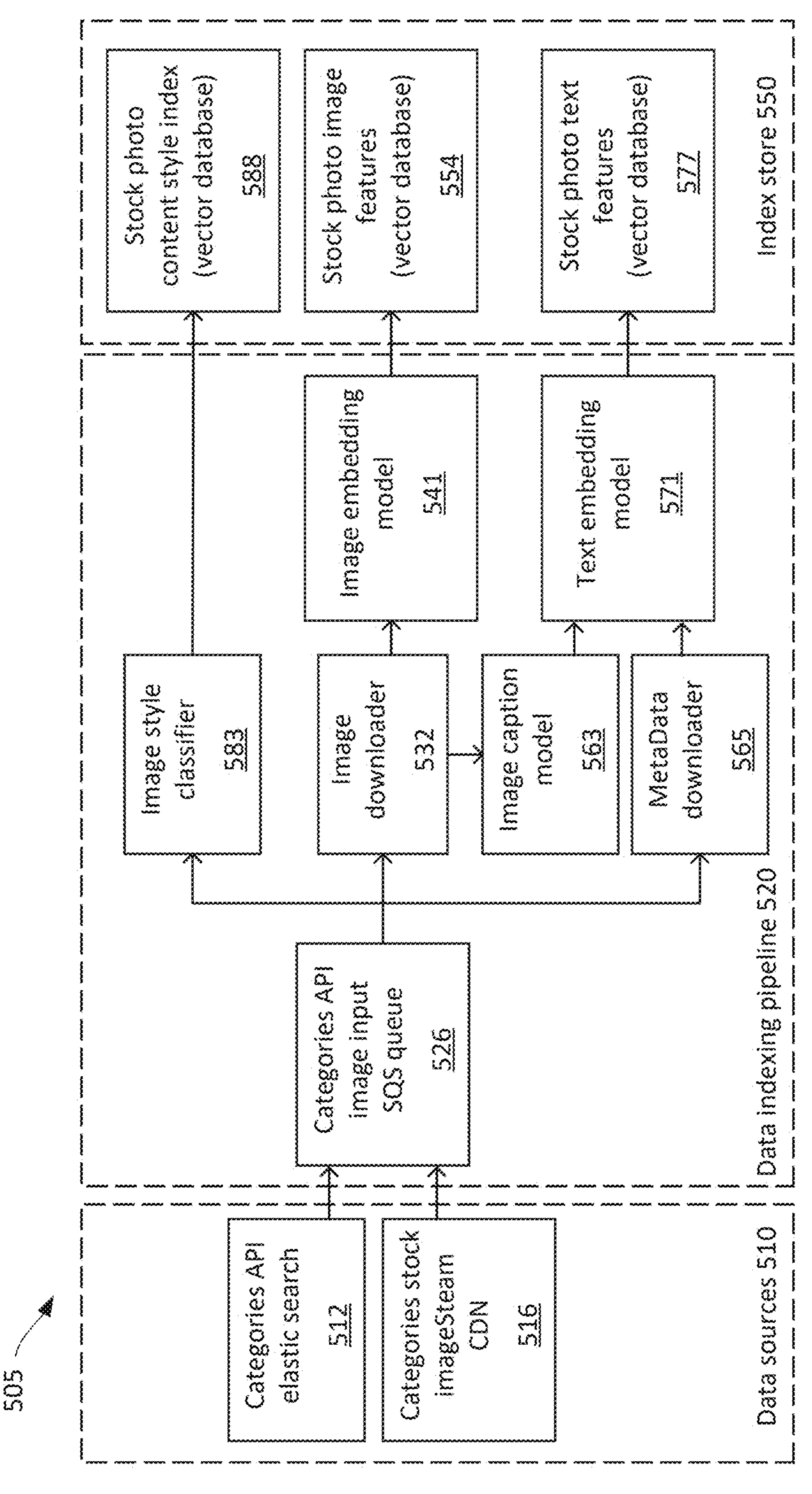

FIGS. 5A and 5B are flowcharts illustrating exemplary stock photo indexing pipelines 500 and 505 in accordance with one or more embodiments of the present disclosure. In some embodiments, stock photo indexing pipeline 500 or 505 may be a part of image candidate generation in block 450 shown in both FIGS. 4A and 4B. The stock photo indexing pipeline 500 or 505 can be divided into three parts: data sources 510, data indexing pipeline 520 and index store 550.

Referring to FIG. 5A, data sources in block 512 that serve as inputs to the data indexing pipeline 520 may be an existing database which contains image metadata, as well as reference to the URLs and identifiers for each stock photo image, known as the "enterprise categories API". The actual images may be stored in, an object store, or file system or database as depicted in block 516.

In some embodiments, the steps performed in the data indexing pipeline 520 may be implemented as a series of programming scripts as represented by block 521.

In at least some aspects of at least one or more embodiments, block 532 refers to an image downloader. Once downloaded from the image metadata in block 512, a list of images may then be downloaded and stored locally for further processing.

In some embodiments, the list of images may be further processed using a multi-modal visual encoder to create vector embeddings in block 541. The vector embeddings representing stock photo image features from block 541 may then be stored in a vector index store in block 552.

In embodiments, the list of images may be further processed using an image caption model or a visual language model to extract a high quality image caption that describes the image in block 563 (e.g., "A freshly baked pizza with melted cheese, topped with sliced tomatoes, glistening basil leaves, and various meats, served on a simple black plate against a warm, dark amber backdrop.").

In at least some aspects of at least one or more embodiments, block 565 refers to a metadata downloader for downloading metadata of each image from the elastic search database in data sources part 510. These metadata features may be processed and cleaned before being indexed.

In at least some aspects of at least one or more embodiments, block 571 refers to a text embedding model. The image captions from block 563 and the textual metadata features from block 565 may then be converted into semantic text vectors using a text similarity encoding model as depicted in block 571. These vector text features representing stock photo text features from block 571 may be stored in a vector index store in block 575.

In at least some aspects of at least one or more embodiments, block 583 refers to an image style classifier. To generate metadata for describing aesthetic visual design style descriptors and features process 500 shown in FIG. 5A or process 505 shown in FIG. 5B may use a visual language model to predict a probability of each image being relevant for each style. The resulting style data may be stored in a stock photo content style index in block 586.

Referring to FIG. 5B, block 526 takes the place of block 521 of FIG. 5A. In block 526, the ingestion pipeline may be driven by a queue, or an orchestration system such as, without limitation, Simple Queue Service (SQS)-type queue exchange or similar.

Referring again to FIG. 5B, blocks 588, 554 and 577 take the place of blocks 586, 552 and 575, respectively, of FIG. 5A. In some embodiments, blocks 588, 554 and 577 employ vector database instead of vector index store of blocks 552 and 575, i.e., all the final indexed data and metadata in FIG. 5B may be stored in a vector database.

Figure 6:
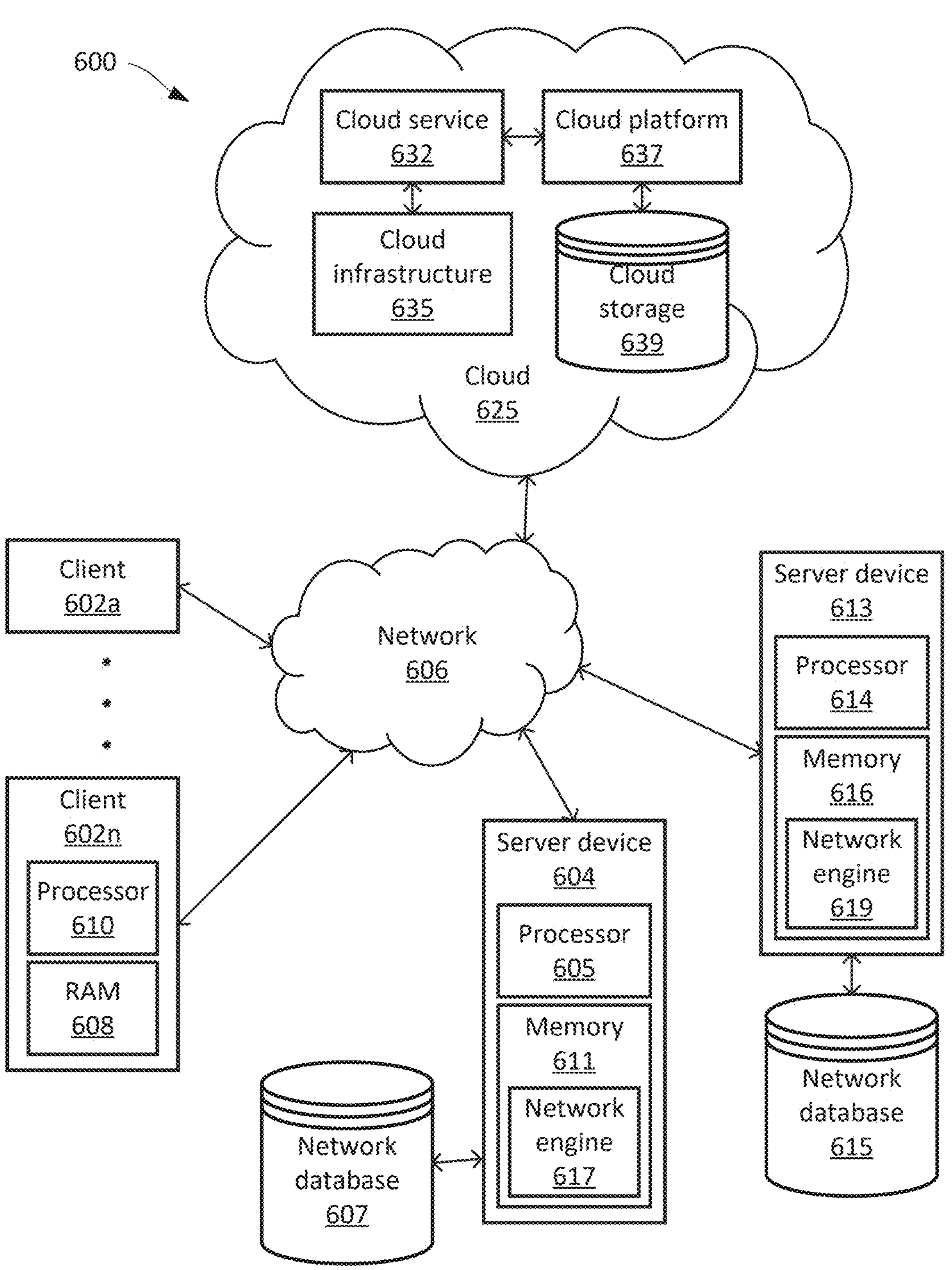
FIG. 6 is a block diagram of an exemplary computer-based system/platform in accordance with one or more embodiments of the present disclosure.

FIG. 6 is a block diagram illustrating an exemplary computer-based system/platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, client computing devices 602*a* through 602*n* shown each at least includes a computer-readable medium, such as a random-access memory (RAM) 608 coupled to a processor 610 or FLASH memory (not shown) associated thereto. In some embodiments, processor 610 may execute computer-executable program instructions stored in memory 608. In some embodiments, processor 610 may include a microprocessor, an ASIC, and/or a state machine. In some embodiments, processor 610 may include, or may be in communication with, media, for example computer-readable media, which stores instructions that, when executed by processor 610, may cause processor 610 to perform one or more steps described herein. In some embodiments, examples of computer-readable media may include, but are not limited to, an electronic, optical, magnetic, or other storage or transmission device capable of providing a processor, such as the processor 610 of client 602*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, client computing devices 602*a* through 602*n* may also comprise a number of external or internal devices such as a mouse, a CD-ROM, DVD, a physical or virtual keyboard, a display, a speaker, or other input or output devices. In some embodiments, examples of client computing devices 602*a* through 602*n* (e.g., clients) may be any type of processor-based platforms that are connected to a network 606 such as, without limitation, personal computers, digital assistants, personal digital assistants, smart phones, pagers, digital tablets, laptop computers, Internet appliances, and other processor-based devices. In some embodiments, client computing devices 602*a* through 602*n* may be specifically programmed with one or more application programs in accordance with one or more principles/methodologies detailed herein. In some embodiments, client computing devices 602*a* through 602*n* may operate on any operating system capable of supporting a browser or browser-enabled application, such as Microsoft™, Windows™, and/or Linux. In some embodiments, client computing devices 602*a* through 602*n* shown may include, for example, personal computers executing a browser application program such as Microsoft Corporation's Internet Explorer™, Apple Computer, Inc.'s Safari™, Mozilla Firefox, and/or Opera. In some embodiments, through the client computing client devices 602*a* through 602*n*, users may communicate over exemplary network 606 with each other and/or with other systems and/or devices coupled to network 606.

As shown in FIG. 6, exemplary server devices 604 and 613 may be also coupled to network 506. Exemplary server device 604 may include a processor 605 coupled to a memory 611 that may store a network engine 617. Exemplary server device 613 may include a processor 614 coupled to a memory 616 that may store a network engine 619. In some embodiments, one or more client computing devices 602*a* through 602*n* may be mobile clients.

As shown in FIG. 6, exemplary server device 604 may be coupled to an exemplary network database 607; and exemplary server device 613 may be coupled to an exemplary network database 615. In some embodiments, exemplary databases 607 and 615 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

As shown in FIG. 6, network 606 may be coupled to a cloud computing/architecture(s) 625. Cloud computing/architecture(s) 625 may include a cloud service 632 coupled to a cloud infrastructure 635 and a cloud platform 637, where the cloud platform 637 may be coupled to a cloud storage 639.

The computing system can also employ any number of software, firmware, and/or hardware configurations. For example, one or more of the example embodiments disclosed herein can be encoded as a computer program (also referred to as computer software, software applications, computer-readable instructions, and/or computer control logic) on a computer-readable medium.

The term "computer-readable medium," as used herein, can generally refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment may be implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform at least some techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD, NetBSD, OpenBSD; (2) Linux; (3) Microsoft Windows; (4) OS X (MacOS); (5) MacOS 11; (6) Solaris; (7) Android; (8) iOS; (9) Embedded Linux; (10) Tizen; (11) WebOS; (12) IBM i; (13) IBM AIX; (14) Binary Runtime Environment for Wireless (BREW); (15) Cocoa (API); (16) Cocoa Touch; (17) Java Platforms; (18) JavaFX; (19) JavaFX Mobile; (20) Microsoft DirectX; (21).NET Framework; (22) Silverlight; (23) Open Web Platform; (24) Oracle Database; (25) Qt; (26) Eclipse Rich Client Platform; (27) SAP NetWeaver; (28) Smartface; and/or (29) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications for implementing the functions of the CVCP as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

In some embodiments, the exemplary inventive computer-based systems, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node may be activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

The aforementioned examples are, of course, illustrative and not restrictive.

At least some aspects of the present disclosure can now be described with reference to the following numbered clauses.

Clause 1. A method, comprising: receiving, by at least one processor via an application programming interface (API) query engine, at least one domain name and context information associated with an entity; generating, by the at least one processor, at least one attribute from parsing the at least one domain name; generating, by the at least one processor utilizing a profile machine learning model, an inferred profile based on the at least one attribute and the context information; generating, by the at least one processor utilizing a keyword machine learning model, a plurality of keywords based on the inferred profile; acquiring, by the at least one processor via APIs, a first plurality of images from a first data source based on the plurality of keywords; indexing, by the at least one processor, the first plurality of images based on text and image embeddings thereof to generate a second plurality of images; filtering, by the at least one processor via a blacklist filter with a predetermined blacklist, the second plurality of images to produce a third plurality of images; ranking, by the at least one processor via a ranker, the third plurality of images based on respective relevancies to the at least one attribute and the context information; selecting, by the at least one processor, a predetermined number of images from the third plurality of images to form a fourth plurality of images, the predetermined number of images ranked higher than rest of the images in the third plurality of images; transmitting, by the at least one processor via APIs, the fourth plurality of images to a computing device associated with the entity; receiving, by the at least one processor via APIs, a selection identifying one of the fourth plurality of images; and automatically embedding, by the at least one processor, the identified one of the fourth plurality of images in at least one website.

Clause 2. The method of clause 1, wherein the context information includes industries and features associated with the entity.

Clause 3. The method of clause 1, wherein parsing the at least one domain name includes extracting at least one uniform resource locator (URL) that identifies the at least one domain name.

Clause 4. The method of clause 3, further comprising providing the at least one URL to a large language model (LLM) for extracting at least one meaning from the at least one URL and including the at least one meaning in the at least one attribute.

Clause 5. The method of clause 1, wherein the inferred profile includes at least an industry associated with the entity.

Clause 6. The method of clause 5, wherein the industry is predicted by a domain-to-industry classification model when the context information does not contain industry information.

Clause 7. The method of clause 1, further comprising storing the inferred profile and the plurality of keywords in a database shared by multiple applications.

Clause 8. The method of clause 1, wherein the first data source is at least one first source remote repository.

Clause 9. The method of clause 8, wherein the first data source is at least one second source repository when the at least one first source remote repository is not accessible.

Clause 10. The method of clause 1, further comprising an embedding query generator to generate a plurality of features used to acquire the first plurality of images from the first data source.

Clause 11. The method of clause 1, wherein the indexing includes encoding the first plurality of images into visual multi-modal feature vectors.

Clause 12. The method of clause 1, wherein the indexing includes generating descriptive captions for each of the first plurality of images by an image caption model.

Clause 13. The method of clause 12, wherein the descriptive captions are encoded into semantic text vector embeddings.

Clause 14. The method of clause 1, wherein the indexing includes downloading metadata associated with each of the first plurality of images.

Clause 15. The method of clause 14, wherein the metadata are encoded into semantic text vector embeddings.

Clause 16. The method of clause 1, wherein the ranking includes penalizing a ranking of one of the third plurality of images based on a predetermined algorithm.

Clause 17. The method of clause 1, wherein the ranking includes reordering rankings of the third plurality of images based on a predetermined diversification algorithm.

Clause 18. The method of clause 1, wherein the fourth plurality of images are logo icons transferred from the third plurality of images.

Clause 19. A system, comprising: at least one processor; and at least one memory storing a plurality of computing instructions configured to instruct the at least one processor to: receive, via an application programming interface (API) query engine, at least one domain name and context information associated with an entity; generate at least one attribute from parsing the at least one domain name; generate, utilizing a profile machine learning model, an inferred profile based on the at least one attribute and the context information; generate, utilizing a keyword machine learning model, a plurality of keywords based on the inferred profile; acquire, via APIs, a first plurality of images from a first data source based on the plurality of keywords; index the first plurality of images based on text and image embeddings thereof to generate a second plurality of images; filter, via a blacklist filter with a predetermined blacklist, the second plurality of images to produce a third plurality of images; rank, via a ranker, the third plurality of images based on respective relevancies to the at least one attribute and the context information; select a predetermined number of images from the third plurality of images to form a fourth plurality of images, the predetermined number of images ranked higher than rest of the images in the third plurality of images; transmit, via APIs, the fourth plurality of images to a computing device associated with the entity; receive, via APIs, a selection identifying one of the fourth plurality of images; and automatically embed the identified one of the fourth plurality of images in at least one website.

Clause 20. The system of clause 19, wherein the computing instructions are further configured to instruct the at least one processor to: extract at least one uniform resource locator (URL) that identifies the at least one domain name; provide the at least one URL to a large language model (LLM) for extracting at least one meaning from the at least one URL; and include the at least one meaning in the at least one attribute.

Publications cited throughout this document are hereby incorporated by reference in their entirety. While one or more embodiments of the present disclosure have been described, it may be understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A computer-implemented method, comprising:

receiving, by at least one processor via an application programming interface (API) query engine, at least one domain name and context information associated with an entity;

generating, by the at least one processor, at least one attribute by parsing the at least one domain name;

generating, by the at least one processor, an inferred profile based on the at least one attribute and the context information;

generating, by the at least one processor utilizing a keyword machine learning model, a plurality of keywords based on the inferred profile;

acquiring, by the at least one processor, a first plurality of images from a data source based on the plurality of keywords, wherein the data source is a remote data source accessed by the at least one processor via APIs;

indexing, by the at least one processor, the first plurality of images based on image embeddings and text embeddings thereof to generate a second plurality of images;

filtering, by the at least one processor via a blacklist filter with a predetermined blacklist, the second plurality of images to generate a third plurality of images to be used in place of the first plurality of images in ranking; and automatically embedding, by the at least one processor, at least one image from the third plurality of images in at least one website, wherein the at least one image is selected based on a predetermined criterion.

2. The computer-implemented method of claim 1, further comprising:

generating, by the at least one processor executing an embedding query generator, a plurality of features from the plurality of keywords for acquiring the first plurality of images from the data source.

3. The computer-implemented method of claim 1, further comprising:

creating, by the at least one processor using a multi-modal visual encoder, the image embeddings to represent image features of the first plurality of images.

4. The computer-implemented method of claim 1, further comprising:

generating, by the at least one processor executing an image caption model, descriptive captions from the first plurality of images;

encoding, by the at least one processor, the descriptive captions into a first plurality of semantic text vector embeddings;

downloading, by the at least one processor, metadata associated with each image of the first plurality of images;

encoding, by the at least one processor, the metadata into a second plurality of semantic text vector embeddings; and creating, by the at least one processor, the text embeddings from the first plurality of semantic text vector embeddings and the second plurality of semantic text vector embeddings.

5. The computer-implemented method of claim 1, wherein the context information includes industries and features associated with the entity.

6. The computer-implemented method of claim 1, wherein the parsing of the at least one domain name comprises:

extracting, by the at least one processor, at least one uniform resource locator (URL) that identifies the at least one domain name.

7. The computer-implemented method of claim 6, further comprising:

providing, by the at least one processor, the at least one URL to a large language model (LLM) for extracting at least one meaning from the at least one URL and including the at least one meaning in the at least one attribute.

8. The computer-implemented method of claim 1, wherein the inferred profile comprises at least an industry associated with the entity.

9. The computer-implemented method of claim 8, wherein the industry is predicted by a domain-to-industry classification model when the context information does not contain industry information.

10. The computer-implemented method of claim 1, further comprising:

storing, by the at least one processor, the inferred profile and the plurality of keywords in a database shared by multiple applications.

11. The computer-implemented method of claim 1, wherein the data source is a second data source when a first data source is not accessible, the second data source being different form the first data source, and the second data source storing the at least one image from the at least one processor.

12. The computer-implemented method of claim 1, further comprising:

ranking, by the at least one processor via a ranker, the third plurality of images based on respective relevancies to the at least one attribute and the context information.

13. The computer-implemented method of claim 12, wherein the ranking comprises at least one of:

penalizing the ranking of one of the third plurality of images based on a predetermined algorithm, or reordering the ranking of the third plurality of images based on a predetermined diversification algorithm.

14. The computer-implemented method of claim 1, wherein the first plurality of images is logo icons.

15. A computer-implemented method, comprising:

receiving, by at least one processor via an application programming interface (API) query engine, at least one domain name and context information associated with an entity;

generating, by the at least one processor, at least one attribute by parsing the at least one domain name;

generating, by the at least one processor, an inferred profile based on the at least one attribute and the context information;

generating, by the at least one processor utilizing a keyword machine learning model, a plurality of keywords based on the inferred profile;

acquiring, by the at least one processor, based on the plurality of keywords, a first plurality of images from a first data source when the first data source is accessible or from a second data source when the first data source is not accessible, the second data source being different form the first data source, and the second data source storing at least one image from the at least one processor;

indexing, by the at least one processor, the first plurality of images based on image embeddings and text embeddings thereof to generate a second plurality of images;

filtering, by the at least one processor via a blacklist filter with a predetermined blacklist, the second plurality of images to generate a third plurality of images;

selecting, by the at least one processor, a predetermined number of images from the third plurality of images to form a fourth plurality of images, the predetermined number of images ranked higher than rest of the images in the third plurality of images;

transmitting, by the at least one processor via APIs, the fourth plurality of images to a computing device associated with the entity;

receiving, by the at least one processor via the APIs, a selection identifying one image of the fourth plurality of images; and automatically embedding, by the at least one processor, the identified one image of the fourth plurality of images in at least one website.

16. The computer-implemented method of claim 15, further comprising:

generating, by the at least one processor executing an embedding query generator, a plurality of features from the plurality of keywords for acquiring the first plurality of images from one of the first data source or the second data source.

17. The computer-implemented method of claim 15, further comprising:

creating, by the at least one processor using a multi-modal visual encoder, the image embeddings to represent image features of the first plurality of images;

generating, by the at least one processor executing an image caption model, descriptive captions from the first plurality of images;

encoding, by the at least one processor, the descriptive captions into a first plurality of semantic text vector embeddings;

downloading, by the at least one processor, metadata associated with the first plurality of images;

encoding, by the at least one processor, the metadata into a second plurality of semantic text vector embeddings; and creating, by the at least one processor, the text embeddings from the first plurality of semantic text vector embeddings and the second plurality of semantic text vector embeddings.

18. A system, comprising:

at least one processor; and at least one memory storing a plurality of computing instructions configured to instruct the at least one processor to:

receive, via an application programming interface (API) query engine, at least one domain name and context information associated with an entity;

generate at least one attribute from parsing the at least one domain name;

generate an inferred profile based on the at least one attribute and the context information;

generate, utilizing a keyword machine learning model, a plurality of keywords based on the inferred profile;

acquire, via APIs, a first plurality of images from a data source based on the plurality of keywords, wherein the data source is a remote data source accessed by the at least one processor via the APIs;

index the first plurality of images based on image embeddings and text embeddings thereof to generate a second plurality of images;

filter, via a blacklist filter with a predetermined blacklist, the second plurality of images to generate a third plurality of images to be used in place of the first plurality of images in ranking; and automatically embed at least one image from the third plurality of images in at least one website, wherein the at least one image is selected based on a predetermined criterion.

* * * * *